(12) United States Patent
Choi

(10) Patent No.: US 9,507,117 B2
(45) Date of Patent: Nov. 29, 2016

(54) LENS MODULE

(71) Applicant: SAMSUNG ELECTRO-MECHANICS CO., LTD., Suwon-Si (KR)

(72) Inventor: Kwang Yun Choi, Suwon-Si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 14/554,036

(22) Filed: Nov. 25, 2014

(65) Prior Publication Data

US 2015/0241656 A1  Aug. 27, 2015

(30) Foreign Application Priority Data

Feb. 26, 2014  (KR) .................. 10-2014-0022776
Jul. 7, 2014    (KR) .................. 10-2014-0084283

(51) Int. Cl.
  *G02B 7/02*   (2006.01)
  *G02B 9/04*   (2006.01)
  *G02B 13/00*  (2006.01)

(52) U.S. Cl.
  CPC .......... *G02B 7/021* (2013.01); *G02B 13/0045* (2013.01); *G02B 7/026* (2013.01); *G02B 9/04* (2013.01)

(58) Field of Classification Search
  CPC ........ G02B 7/02; G02B 7/021; G02B 7/026; G02B 9/04; G02B 9/06; G02B 9/08; G02B 9/10
  USPC ........ 359/642, 686–692, 738, 754–762, 819, 359/829, 830
  See application file for complete search history.

(56) References Cited

U.S. PATENT DOCUMENTS

| | | | | |
|---|---|---|---|---|
| 6,008,953 | A * | 12/1999 | Itoh ..................... | G02B 15/161 359/692 |
| 7,463,432 | B2 * | 12/2008 | Diamantidis .......... | G02B 13/16 359/350 |
| 2005/0111116 | A1 | 5/2005 | Okajima et al. | |
| 2006/0103954 | A1 * | 5/2006 | Hamasaki ............. | G02B 7/023 359/825 |
| 2006/0140623 | A1 | 6/2006 | Yu | |
| 2006/0171046 | A1 * | 8/2006 | Recco .................... | G02B 7/021 359/811 |
| 2009/0015945 | A1 * | 1/2009 | Chen ..................... | G02B 7/021 359/819 |
| 2010/0214677 | A1 | 8/2010 | Monti | |
| 2011/0069198 | A1 | 3/2011 | Ezawa et al. | |

(Continued)

FOREIGN PATENT DOCUMENTS

| CN | 1797054 A | 7/2006 |
|---|---|---|
| CN | 102016678 A | 4/2011 |

(Continued)

OTHER PUBLICATIONS

Korean Office Action issued Feb. 1, 2016 in counterpart Korean Application No. KR 10-2014-0084283 (11 pages, in Korean, with English language translation).

(Continued)

*Primary Examiner* — Darryl J Collins
(74) *Attorney, Agent, or Firm* — NSIP Law

(57) ABSTRACT

There is provided a lens module including: a first lens group including a plurality of lenses mounted in a lens barrel in a state in which optical axes thereof are aligned with each other by coupling therebetween; and a second lens group including a plurality of lenses sequentially mounted in the lens barrel, such that optical axes thereof are aligned with each other.

17 Claims, 8 Drawing Sheets

(56) References Cited

U.S. PATENT DOCUMENTS

| | | |
|---|---|---|
| 2011/0090582 A1 | 4/2011 | Chou |
| 2012/0014001 A1* | 1/2012 | Kurihara ............... B29C 33/306 359/819 |
| 2013/0050850 A1 | 2/2013 | Lin |
| 2013/0077183 A1 | 3/2013 | An et al. |
| 2013/0135514 A1* | 5/2013 | Maetaki ................. G02B 9/04 348/340 |
| 2014/0029114 A1 | 1/2014 | Kim |

FOREIGN PATENT DOCUMENTS

| | | |
|---|---|---|
| CN | 103576276 A | 2/2014 |
| JP | 2002-286987 A | 10/2002 |
| JP | 2006-017795 | 1/2006 |
| JP | 2012-83439 A | 4/2012 |
| KR | 10-2006-0081971 A | 7/2000 |
| KR | 10-2007-0097082 A | 10/2007 |
| KR | 10-2012-0063376 A | 6/2012 |
| WO | WO 2006/083649 A1 | 8/2006 |

OTHER PUBLICATIONS

Chinese Office Action issued on Sep. 29, 2016 in counterpart Chinese Patent Application No. 201410806382.7. (19 pages in Chinese with English translation).

* cited by examiner

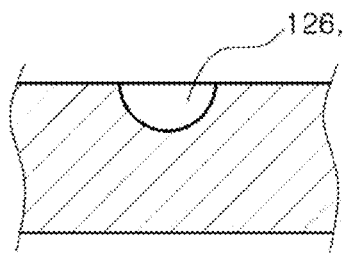
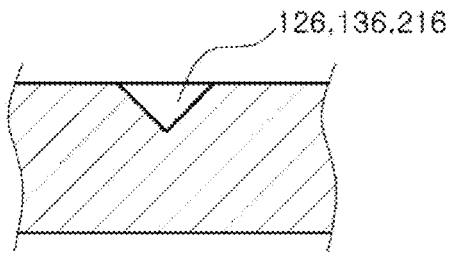
FIG. 10A
FIG. 10B
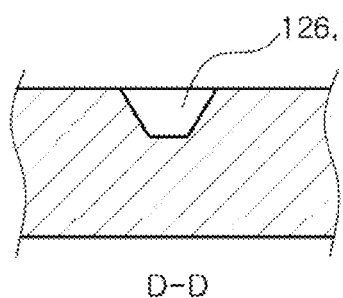
FIG. 10C
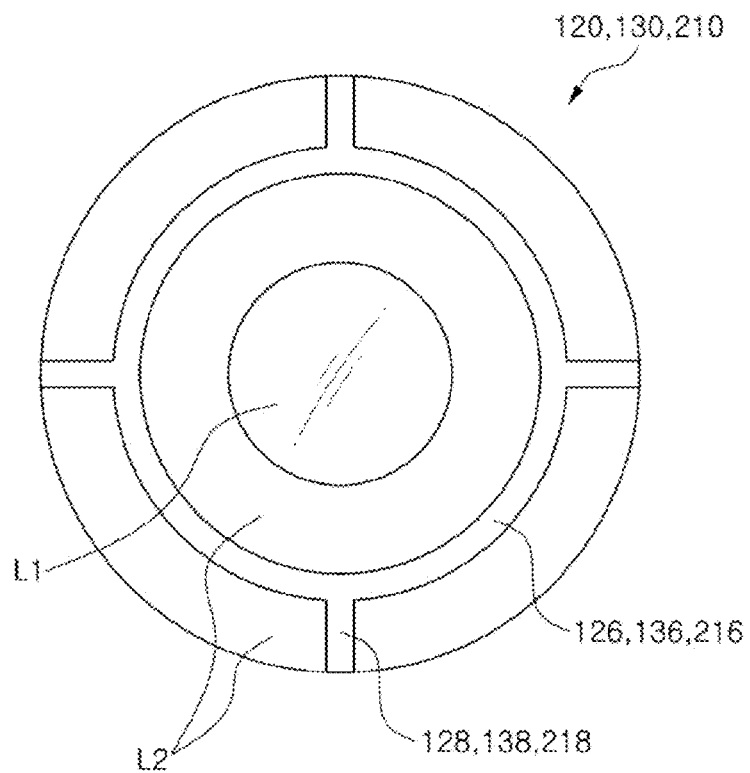
FIG. 11

LENS MODULE

CROSS-REFERENCE TO RELATED APPLICATIONS

This application claims the benefit of Korean Patent Application Nos. 10-2014-0022776 filed on Feb. 26, 2014 and 10-2014-0084283 filed on Jul. 7, 2014, with the Korean Intellectual Property Office, the disclosures of which are incorporated in their entireties herein by reference.

BACKGROUND

The present disclosure relates to a lens module in which lenses may be easily aligned with each other.

In accordance with improvements in the performance of portable devices (for example, portable phones), small camera units mounted in portable devices have been required to have high degrees of resolution. Therefore, such small camera units have been gradually configured as lens modules including a number of lenses.

Such lens modules including a number of lenses may include lenses as well as a lens barrel accommodating the lenses therein. Such lens modules have a structure in which the lenses are sequentially inserted into the lens barrel to allow optical axes of the lenses to coincide with each other.

However, since the optical axes of the lenses are aligned with each other by the lens barrel in the above-mentioned structure, the lenses mounted in the lens barrel must be manufactured so as to have the same outer diameter or the same degree of machining tolerance, which may be somewhat difficult.

Further, in the above-mentioned structure, the respective lenses may be inserted into the lens barrel in a press-fitting scheme, and thus, coupling the lenses to the lens barrel may be somewhat difficult.

SUMMARY

An aspect of the present disclosure may provide a lens module in which lenses may be easily aligned with each other.

According to an aspect of the present disclosure, a lens module may include: a first lens group including a plurality of lenses mounted in a lens barrel in a state in which optical axes thereof are aligned with each other by coupling therebetween; and a second lens group including a plurality of lenses sequentially mounted in the lens barrel, such that optical axes thereof are aligned with each other.

According to another exemplary embodiment of the present disclosure, a lens module may include: a lens barrel having inner peripheral surfaces having different sizes in a radial direction; a first lens group including a plurality of lenses mounted in the lens barrel and having coupling protrusions formed from light blocking portions thereof so that optical axis alignment is possible by coupling therebetween; and a second lens group disposed so that a distance therefrom to an image plane is shorter than a distance from the first lens group to the image plane and including a plurality of lenses contacting the inner peripheral surfaces of the lens barrel, such that optical axes of the lenses are aligned with each other.

BRIEF DESCRIPTION OF DRAWINGS

The above and other aspects, features and other advantages of the present disclosure will be more clearly understood from the following detailed description taken in conjunction with the accompanying drawings, in which:

FIGS. 10A through 10C are cross-sectional views taken along line D-D in FIG. 9;

FIG. 11 is a bottom view illustrating another form of the lenses illustrated in FIG. 9.

DETAILED DESCRIPTION

Figure 1:
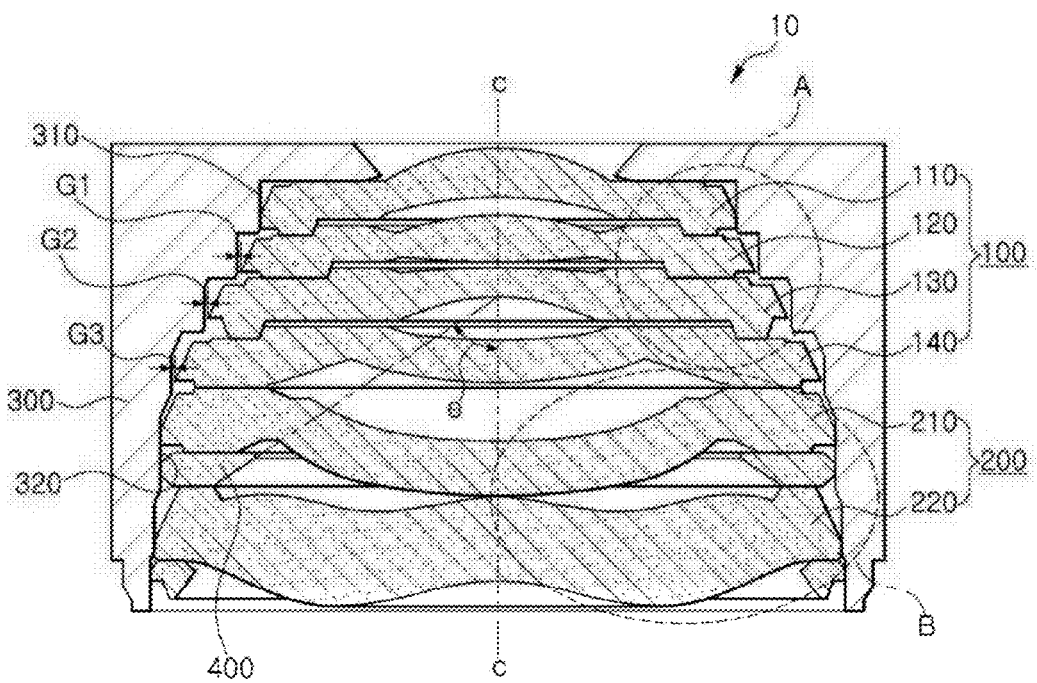
FIG. 1 is a cross-sectional view of a lens module according to an exemplary embodiment of the present disclosure.

Hereinafter, embodiments of the present disclosure will be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

In addition, it is to be noted that in the present specification, a first lens refers to a lens closest to an object side and a sixth lens refers to a lens closest to an image side. Further, it is to be noted that a front side refers to a side of a lens module disposed toward the object side, and a rear side refers to a side of the lens module disposed toward the image sensor. Further, it is to be noted that a first surface of each lens refers to a surface in the object side direction (or an object-side surface) and a second surface of each lens refers to a surface in the image side direction (or an image-side surface).

A lens module according to an exemplary embodiment of the present disclosure will hereinafter be described with reference to FIG. 1.

The lens module 10 may include a plurality of lenses. For example, the lens module 10 may include six lenses 110, 120, 130, 140, 210, and 220. However, an optical system of the lens module 10 is not limited to including the six lenses. For example, the optical system of the lens module 10 may include five or seven lenses. As another example, the optical system of the lens module 10 may include four or less or eight or more lenses.

The lens module 10 may include a lens barrel 300. For example, the lens module 10 may include the lens barrel 300 accommodating the plurality of lenses 110, 120, 130, 140, 210, and 220 therein. However, the lens barrel 300 may not necessarily accommodate all of the lenses 110, 120, 130, 140, 210, and 220 therein. As an example, the lens barrel 300 may not accommodate some of the plurality of lenses 110, 120, 130, 140, 210, and 220 therein. The lens barrel 300 may have inner peripheral surfaces 310 and 320 having different diameters. For example, a first inner peripheral surface 310 accommodating a first lens group 100 therein and a second peripheral surface 320 accommodating a second lens group 200 therein may have different sizes in a radial direction (that is, diameters).

The lens module 10 may include a gap maintaining member 400. For example, the lens module 10 may include one or more gap maintaining member 400 configured to maintain a constant distance between the lenses. For reference, although the case in which one gap maintaining member 400 is disposed between fifth and sixth lenses 210 and 220 has been illustrated in FIG. 1, the gap maintaining member may also be disposed between other lenses, if necessary.

Next, lenses configuring the optical system of the lens module 10 will be described.

The optical system of the lens module 10 may be configured of a plurality of lenses. For example, the optical system may be configured of a first lens 110, a second lens 120, a third lens 130, a fourth lens 140, a fifth lens 210, and a sixth lens 220. Here, the first lens 110, the second lens 120, the third lens 130, the fourth lens 140, the fifth lens 210, and a sixth lens 220 may be sequentially disposed from an object side toward an image plane. The lenses 110, 120, 130, 140, 210, and 220 configuring the optical system may be formed of plastic. For example, the lenses 110, 120, 130, 140, 210, and 220 may be formed of a resin having a predetermined refractive index and excellent transparency.

The lenses of the optical system may be divided into two groups. For example, the optical system may include the first lens group 100 and the second lens group 200. However, the number of lens groups configuring the optical system is not limited to two. For example, the optical system may also be configured of three or more lens groups, if necessary.

The first lens group 100 and the inner peripheral surface 310 of the lens barrel 300 may have a gap formed therebetween. For example, an outer peripheral surface of the second lens 120 and the inner peripheral surface 310 of the lens barrel 300 may have a first gap G1 formed therebetween, an outer peripheral surface of the third lens 130 and the inner peripheral surface 310 of the lens barrel 300 may have a second gap G2 formed therebetween, and an outer peripheral surface of the fourth lens 140 and the inner peripheral surface 310 of the lens barrel 300 may have a third gap G3 formed therebetween. For reference, a gap may not be formed between an outer peripheral surface of the first lens 110 and the inner peripheral surface 310 of the lens barrel 300.

Since the first lens group 100 formed as described above does not substantially contact the inner peripheral surface of the lens barrel 300, optical axis C-C of the lenses may be aligned with each other by only coupling between the lenses. Therefore, the first lens group 100 may have a substantially large manufacturing tolerance range (that is, may have low tolerance sensitivity). In addition, the first lens group 100 may be insensitive to an influence due to a manufacturing tolerance and thermal deformation of the lens barrel 300.

The second lens group 200 may include a plurality of lenses. For example, the second lens group 200 may include the fifth and sixth lenses 210 and 220. However, the number of lenses configuring the second lens group 200 is not limited to two. For example, the second lens group 200 may also be configured of three or more lenses.

The lens barrel 300 may be formed of a material that is substantially the same as or similar to that of the lens. In addition, the lens barrel 300 may be formed of a material having a contraction rate and a linear thermal expansion rate that is substantially the same as or similar to that of the material of the lens. Further, the lens barrel 300 may also be formed of a material having a low degree of transparency. However, a material of the lens barrel 300 is not limited to the above-mentioned material. For example, the lens barrel 300 may also be formed of a material different from that of the lens.

The gap maintaining member 400 may be disposed between the lenses. For example, the gap maintaining member 400 may be disposed between the fifth and sixth lenses 210 and 220. The gap maintaining member 400 may have an inner peripheral surface with a predetermined inclination angle θ with respect to the optical axis C-C. The gap maintaining member 400 having the above-mentioned shape may suppress a flare phenomenon.

Since the lens module 10 configured as described above includes a plurality of lens groups having different optical axis aligning structures, respectively, depending on sizes of the lenses, manufacturing tolerance sensitivity of the lenses, and the like, a manufacturing yield of the lens module 10 may be improved, and resolution dispersion may be decreased.

Figure 2:
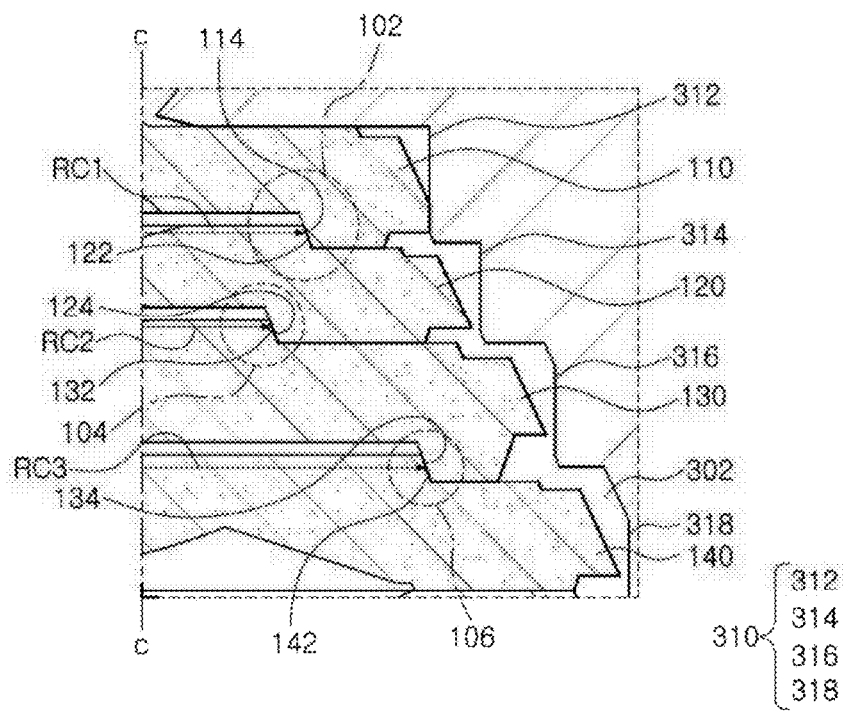
FIG. 2 is an enlarged cross-sectional view of part A illustrated in FIG. 1.

The first lens group 100 will be described with reference to FIG. 2.

The first lens group 100 may include a plurality of lenses. For example, the first lens group 100 may include the first to fourth lenses 110 to 140. However, the number of lenses configuring the first lens group 100 is not limited to fourth. For example, the first lens group 100 may also be configured of three or less or five or more lenses.

The first lens group 100 may be coupled to the preceding lens or the following lens, such that the optical axes of the lenses may be aligned with each other. For example, the second lens 120 may be coupled to the first lens 110, such that the optical axes of the first and second lenses 110 and 120 are aligned with each other, the third lens 130 may be coupled to the second lens 120, such that the optical axes of the second and third lenses 120 and 130 are aligned with each other, and the fourth lens 140 may be coupled to the third lens 130, such that the optical axes of the third and fourth lenses 130 and 140 are aligned with each other. To this end, the first to fourth lenses 110 to 140 may be provided with coupling protrusions 114, 122, 124, 132, 134, and 142, respectively, as illustrated in FIG. 2. For example, the first lens 110 may have the coupling protrusion 114 formed on a second surface thereof, the second lens 120 may have the coupling protrusions 122 and 124 each formed on first and second surfaces thereof, the third lens 130 may have the coupling protrusions 132 and 134 each formed on first and second surfaces thereof, and the fourth lens 140 may have the coupling protrusion 142 formed on a first surface thereof.

The respective coupling protrusions 114, 122, 124, 132, 134, and 142 may have inclined surfaces substantially inclined with respect to the optical axis C-C. For example, inner peripheral surfaces of the coupling protrusions 114, 122, 124, 132, 134, and 142 may be inclined surfaces that are not in parallel with the optical axis C-C. The respective coupling protrusions 114, 122, 124, 132, 134, and 142 may have different inclination angles. For example, a first coupling protrusion 114 of the first lens 110 may have an inclination angle different from that of a second coupling protrusion 122 of the second lens 120, a third coupling protrusion 124 of the second lens 120 may have an inclination angle different from that of a fourth coupling protrusion 132 of the third lens 130, and a fifth coupling protrusion 134 of the third lens 130 may have an inclination angle different from that of a sixth coupling protrusion 142 of the fourth lens 140. Since the coupling protrusions 114, 122, 124, 132, 134, and 142 configured as described above line-contact corresponding coupling protrusions, it may facilitate optical axis alignment between the lenses. In addition, since the coupling protrusions 114, 122, 124, 132, 134, and 142 configured as described above may increase a manufacturing tolerance range, it may facilitate the manufacture of the lenses.

The lenses 110, 120, 130, and 140 of the first lens group 100 may be coupled to each other at a position at which they are not overlapped with each other. For example, a distance RC1 from the optical axis C-C to a coupled part 102 between the first and second lenses 110 and 120 may be larger than a distance RC2 from the optical axis C-C to a coupled part 104 between the second and third lenses 120 and 130. In addition, the distance RC2 from the optical axis C-C to the coupled part 104 between the second and third lenses 120 and 130 may be smaller than a distance RC3 from the optical axis C-C to a coupled part 106 between the third and fourth lenses 130 and 140.

Positions in which the coupled parts 102, 104, and 106 are formed may be advantageous in dispersing coupling stress between the lenses 110, 120, 130, and 140.

The lenses 110, 120, 130, and 140 of the first lens group 100 and the inner peripheral surface 310 of the lens barrel 300 may have a significant space 302 formed therebetween. For example, the space 302 that does not contact outer peripheral surfaces of the lens 110, 120, 130, and 140 may be formed between the first to fourth lenses 110 to 140 and the inner peripheral surfaces 310: 312, 314, 316, and 318 of the lens barrel 300. In addition, the space 302 may be provided to have a significant size so that the second to fourth lenses 120 to 140 do not contact the inner peripheral surfaces 314, 316, and 318 having step shapes. For example, although the first lens 110 partially contacts the inner peripheral surfaces 312, 316, and 318, the second to fourth lenses 120 to 140 do not contact any portion of the inner peripheral surfaces 314, 316, and 318.

In the first lens group 100 configured as described above, since the optical axis alignment between the lenses 110, 120, 130, and 140 is only performed by coupling between the lenses 110, 120, 130, and 140, deformation of the lenses due to coupling stress between the lenses and the lens barrel 300 may be significantly decreased.

In addition, since most of the first lens group 100 does not contact the inner peripheral surface 310 of the lens barrel 300, manufacturing tolerances of the lenses may be increased.

A form of lenses of the first lens group 100 will be described with reference to FIG. 3.

Figure 3:
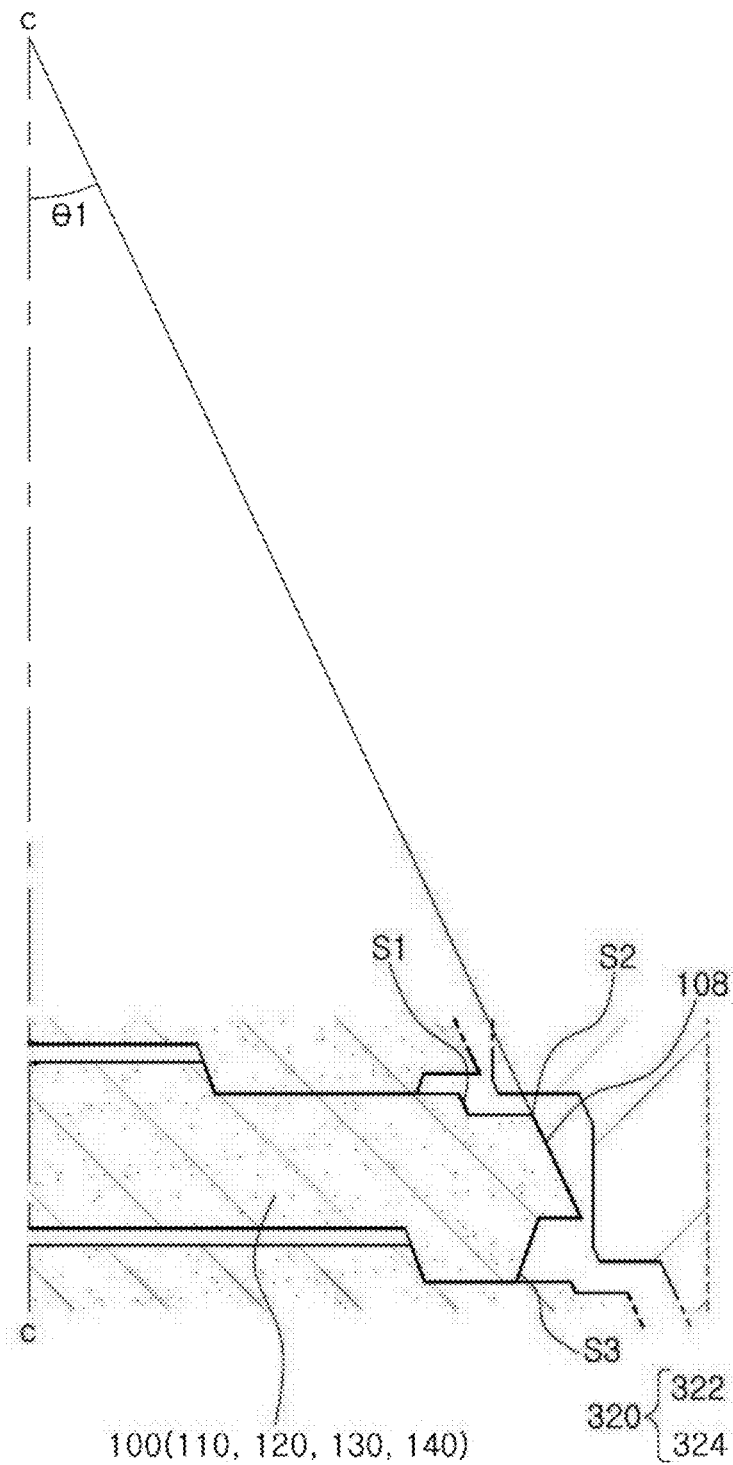
FIG. 3 is an enlarged cross-sectional view of any lens among lenses illustrated in FIG. 2.

For reference, a lens illustrated in FIG. 3 may be one of the lenses configuring the first lens group 100. Therefore, the lens illustrated in FIG. 3 may be any one of the first to fourth lenses 110 to 140 or all of the first to fourth lenses 110 to 140.

The lens 110, 120, 130, or 140 of the first lens group 100 may be provided with a plurality of steps S1, S2, and S3. For example, the steps S1, S2, and S3 represented by a clear line when observed from an object side or an image side may be formed from light blocking portions of the lens 110, 120, 130, or 140. The steps S1, S2, and S3 may be used as a reference in deciding the center of the optical axes of the lens 110, 120, 130, or 140.

The lens 110, 120, 130, or 140 of the first lens group 100 may have an inclined surface or a conical surface. For example, an outer peripheral surface of the lens 110, 120, 130, or 140 may be processed in a shape of a conical surface having a predetermined inclination θ1 with respect to the optical axis C-C. This conical surface may significantly decrease a molding remnant (generally called a burr) generated in a process of manufacturing the lens 110, 120, 130, or 140. In addition, this conical surface may significantly decrease or prevent an interference phenomenon between the lens 110, 120, 130, and 140 and the lens barrel 300 due to the molding remnant.

Figure 4:
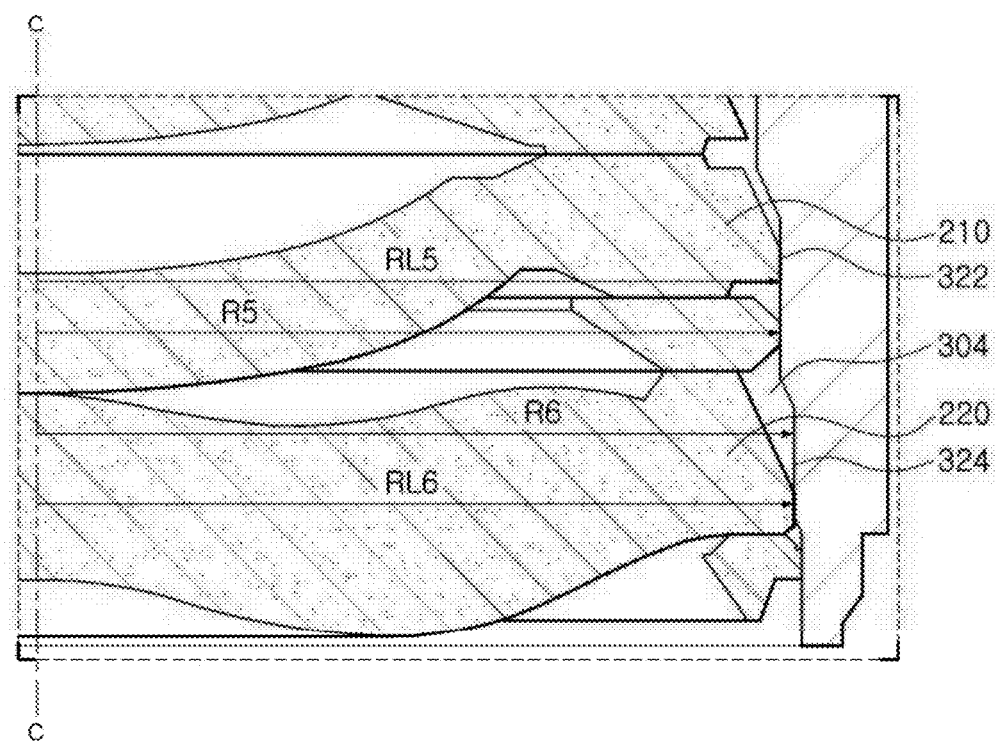
FIG. 4 is an enlarged cross-sectional view of part B illustrated in FIG. 1.

The second lens group 200 will be described with reference to FIG. 4.

The second lens group 200 may be coupled to the lens barrel 300, such that the optical axes of the lenses may be aligned with each other. For example, the fifth and sixth lenses 210 and 220 may be fitted into the lens barrel 300, such that optical axes thereof may be aligned with the optical axis of the first lens group 100. To this end, a radius RL5 of the fifth lens 210 may be substantially the same as a radius R5 of an inner peripheral surface 322 of the lens barrel 300. Likewise, a radius RL6 of the sixth lens 220 may be substantially the same as a radius R6 of an inner peripheral surface 324 of the lens barrel 300. However, entire outer peripheral surfaces of the fifth and sixth lenses 210 and 220 do not contact an inner peripheral surface 320 of the lens barrel 300. For example, a space 304 in which the fifth and sixth lenses 210 and 220 and the inner peripheral surface 320 of the lens barrel 300 do not contact each other may be formed between the fifth and sixth lenses 210 and 220 and the inner peripheral surface 320 of the lens barrel 300.

The second lens group 200 may be generally configured of large and thick lenses. In addition, molding contraction and deformation of the lenses of the second lens group 200 may be small. Therefore, the lenses of the second lens group 200 may be easily manufactured so as to be appropriate for a size of the lens barrel 300 and may be coupled to the lens barrel 300, such that optical axis alignment therebetween may be possible.

Figure 5:
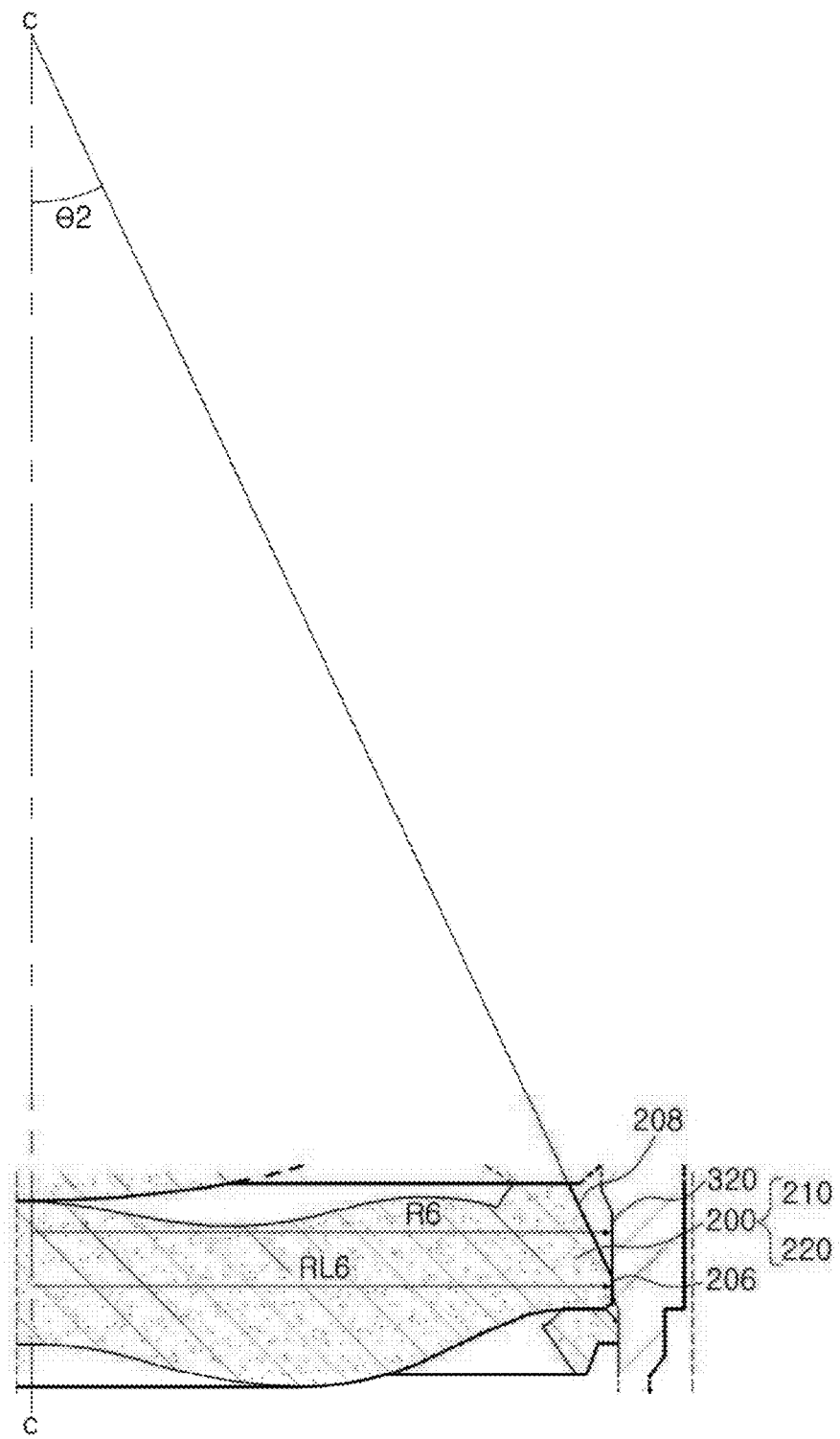
FIG. 5 is an enlarged cross-sectional view of any lens among lenses illustrated in FIG. 4.

A form of lenses of the second lens group 200 will be described with reference to FIG. 5.

The lens 210 and 220 of the second lens group 200 may have an inclined surface 208 or a conical surface. For example, outer peripheral surfaces of the lens 210 and 220 may be processed in a shape of a conical surface having a predetermined inclination θ2 with respect to the optical axis C-C. This conical surface may significantly decrease a molding remnant (generally called a burr) generated in a process of manufacturing the lenses 210 and 220. In addition, this conical surface may significantly decrease or prevent an interference phenomenon between the lenses 210 and 220 and the lens barrel 300 due to the molding remnant.

The lenses 210 and 220 of the second lens group 200 may have outer peripheral surfaces 206 that are substantially in parallel with the inner peripheral surface 320 of the lens barrel 300. The outer peripheral surfaces 206 may increase coupling force between the lens 210 and 220 and the lens barrel 300 and enable optical axis alignment between the lenses 210 and 220.

Figure 6:
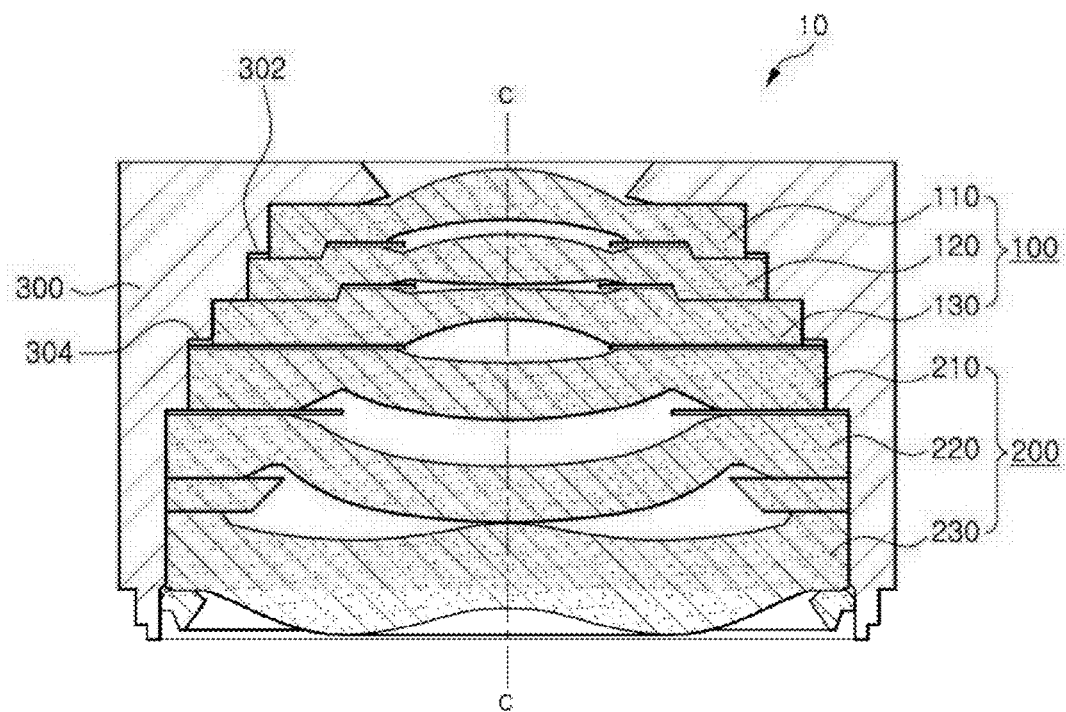
FIG. 6 is a cross-sectional view of a lens module according to another exemplary embodiment of the present disclosure.

Next, a lens module according to another exemplary embodiment of the present disclosure will be described with reference to FIG. 6.

A lens module 10 according to the present exemplary embodiment may be different from the lens module in terms of the distribution of lens groups according to an exemplary embodiment of the present disclosure described above.

For example, a first lens group 100 may be configured of a first lens 110, a second lens 120, and a third lens 130, and a second lens group 200 may be configured of a fourth lens 210, a fifth lens 220, and a sixth lens 230.

In addition, the lens 120 and 210 and the lens barrel 300 may have a plurality of spaces 302 and 304 formed therebetween, respectively. The spaces 302 and 304 may serve to alleviate coupling stress between the lens 120 and 210 and the lens barrel 300.

The lens module 10 configured as described above may be advantageous in the case in which manufacturing tolerance sensitivity of the first to third lenses 110 to 130 is large and manufacturing tolerance sensitivity of the fourth to sixth lenses 210 and 230 is small. Alternatively, the lens module 10 configured as described above may be advantageous in the case in which linear thermal expansion rates of the first to third lenses 110 to 130 are large and linear thermal expansion rates of the fourth to sixth lenses 210 and 230 are small.

Figure 7:
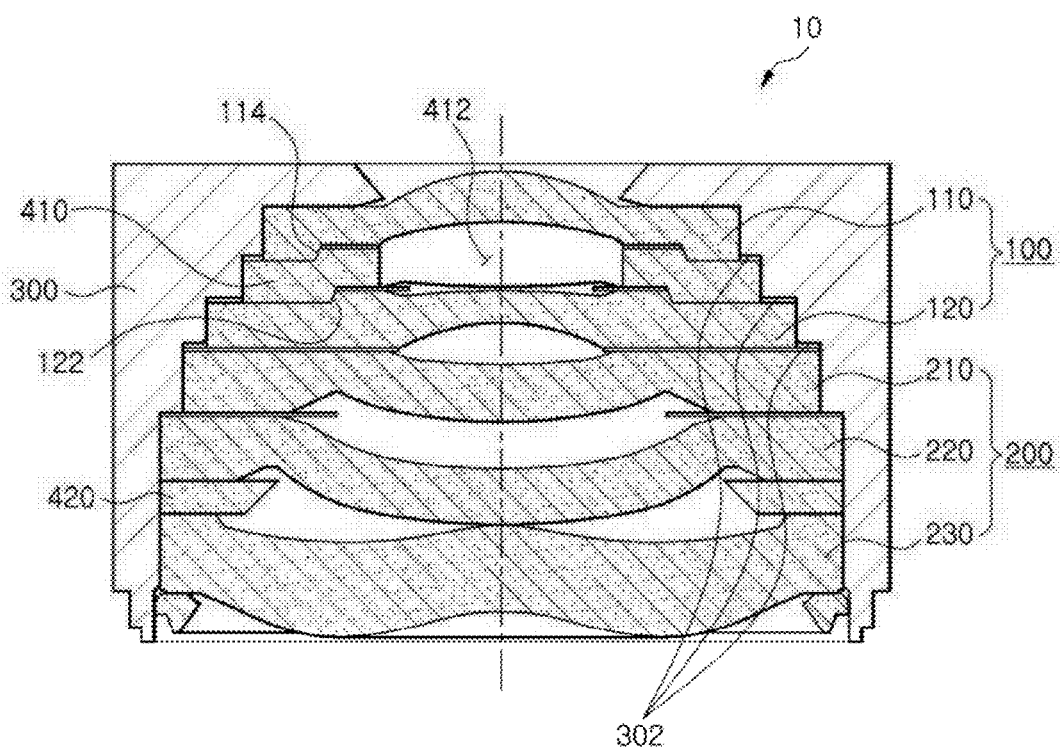
FIG. 7 is a cross-sectional view of a lens module according to another exemplary embodiment of the present disclosure.

Next, a lens module according to another exemplary embodiment of the present disclosure will be described with reference to FIG. 7.

A lens module 10 according to the present exemplary embodiment may be different in terms of a configuration of a first lens group 100 from the lens modules according to exemplary embodiments of the present disclosure described above.

For example, in the present exemplary embodiment, the first lens group 100 may include one or more gap maintaining member 410. In addition, the first lens group 100 may include a plurality of lenses 110 and 120 coupled to the gap maintaining member 410, such that optical axes thereof are aligned with each other. For example, a first lens 110 may be coupled to the gap maintaining member 410 through a coupling protrusion 114, such that a position of an optical axis thereof may be aligned, and a second lens 120 may be coupled to the gap maintaining member 410 by a coupling protrusion 122, such that a position of an optical axis thereof may be aligned.

In addition, the gap maintaining member 410 and the lens barrel 300 and the lenses 120 and 210 and the lens barrel 300 may have a plurality of spaces 302 formed therebetween. The spaces 302 and 304 may serve to alleviate coupling stress generated due to a contact with the lens barrel 300.

The lens module 10 configured as described above may be advantageous in the case in which a distance is required to be maintained between the lenses configuring the first lens group 100. Meanwhile, the gap maintaining member 410 may serve as a stop. For example, the gap maintaining member 410 may have an aperture 412 smaller than an effective diameter of the first lens 110 so as to adjust an amount of light incident from the first lens 110.

For reference, reference numeral 420 indicates a gap maintaining member disposed in the second lens group 200.

Figure 8:
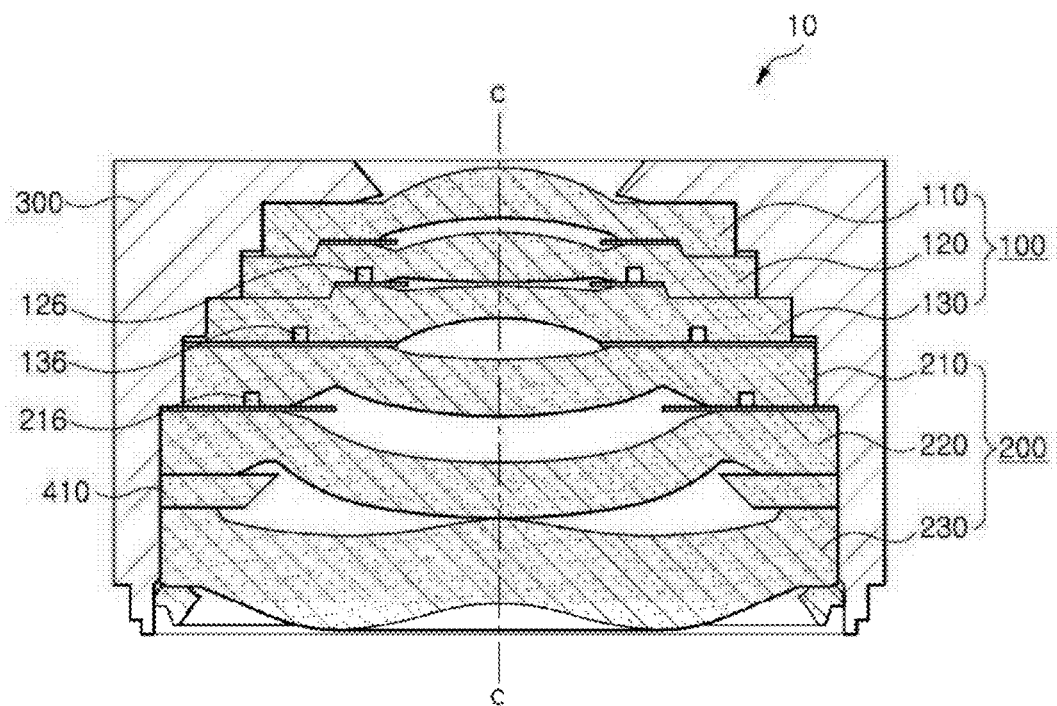
FIG. 8 is a cross-sectional view of a lens module according to another exemplary embodiment of the present disclosure.

Next, a lens module according to another exemplary embodiment of the present disclosure will be described with reference to FIG. 8.

A lens module 10 according to the present exemplary embodiment may be different in from the lens modules according to exemplary embodiments of the present disclosure described above terms of the shapes of lenses included therein.

For example, grooves 126, 136, and 216 may be formed in at least one of first to sixth lenses 110 to 230. As an example, the grooves 126 and 136 may be formed in the second and third lenses 120 and 130 of the first lens group 100, respectively, and the groove 216 may be formed in the fourth lens 210 of the second lens group 200. However, lenses in which the grooves are formed are not limited to the above-mentioned lenses. For example, the grooves may be formed in all lenses.

The grooves 126, 136, and 216 may absorb internal stress due to contraction or expansion deformation of the lenses to significantly decrease deformation of the lenses. In addition, the grooves 126, 136, and 216 may decrease stress generated in a process of coupling the lenses to each other or coupling the lenses and the lens barrel to each other. For example, the grooves 126, 136, and 216 may serve to absorb stress generated in coupled parts between the lenses.

A planar form of the groove 216 will be described with reference to FIG. 9.

Figure 9:
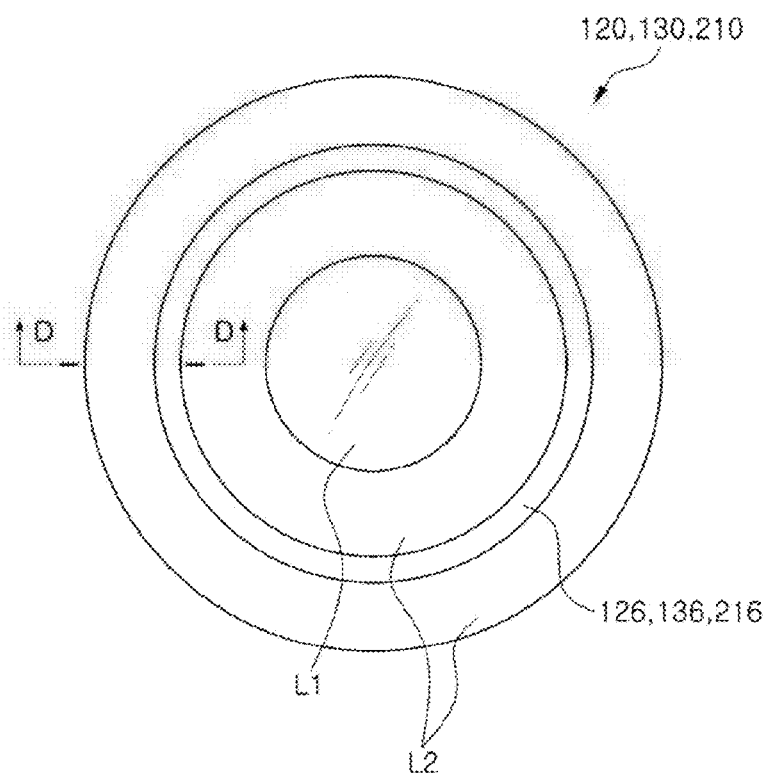
FIG. 9 is a bottom view of lenses in which grooves are formed in FIG. 8.

The grooves 126, 136, and 216 may have a circular shape, based on the optical axes of the lenses 120, 130, and 210, as illustrated in FIG. 9. However, the grooves 126, 136, and 216 are not limited to having the circular shape. For example, the grooves 126, 136, and 216 may have any shape discontinuously formed, based on the optical axes of the lenses 120, 130, and 210, respectively, for example, a curved shape, a linear shape, or the like.

The grooves 126, 136, and 216 may be formed in at least one of first and second surfaces of the lenses 120, 130, and 210, respectively. For example, although the case in which the grooves 126, 136, and 216 are formed in the second surfaces (lower surface based on FIG. 9) of the lenses 120, 130, and 210, respectively, has been illustrated in FIG. 9, the grooves 126, 136, and 216 may also be formed in the first surfaces (upper surface based on FIG. 9) of the lenses 120, 130, and 210, respectively, if necessary. Alternatively, the grooves 126, 136, and 216 may be formed on both surfaces of the lenses 120, 130, and 210, respectively. Meanwhile, it may be preferable that the grooves 126, 136, and 216 are formed in light blocking portions enclosing effective parts L1 of the lenses.

A cross-sectional shape of the groove will be described with reference to FIGS. 10A through 10C.

The grooves 126, 136, and 216 may have any shape as long as they may suppress stress generated in the lenses. As an example, as illustrated in FIG. 10A, the grooves 126, 136, and 216 may have hemispherical cross sectional shapes. As another example, as illustrated in FIG. 10B, the grooves 126, 136, and 216 may have inverse triangular cross sectional shapes. As another example, as illustrated in FIG. 10C, the grooves 126, 136, and 216 may have trapezoidal cross sectional shapes.

Another shape of the groove will be described with reference to FIG. 11.

Shapes of the grooves 126, 136, and 216 may be changed so as to absorb expansion pressure generated in a process of coupling the lenses to each other. For example, auxiliary grooves 128, 138, and 218 that may absorb or offset air pressure generated in a process in which the lenses surface-contact each other may be formed in the lenses, respectively.

The auxiliary grooves 128, 138, and 218 may be extended from edges of the lenses toward the center of the lenses in a radial direction, respectively, and may be connected to the grooves 126, 136, and 216, respectively.

In the lens module 10 configured as described above, assembly stress and expansion pressure generated in the process of coupling the lenses to each other may be decreased.

Figure 12:
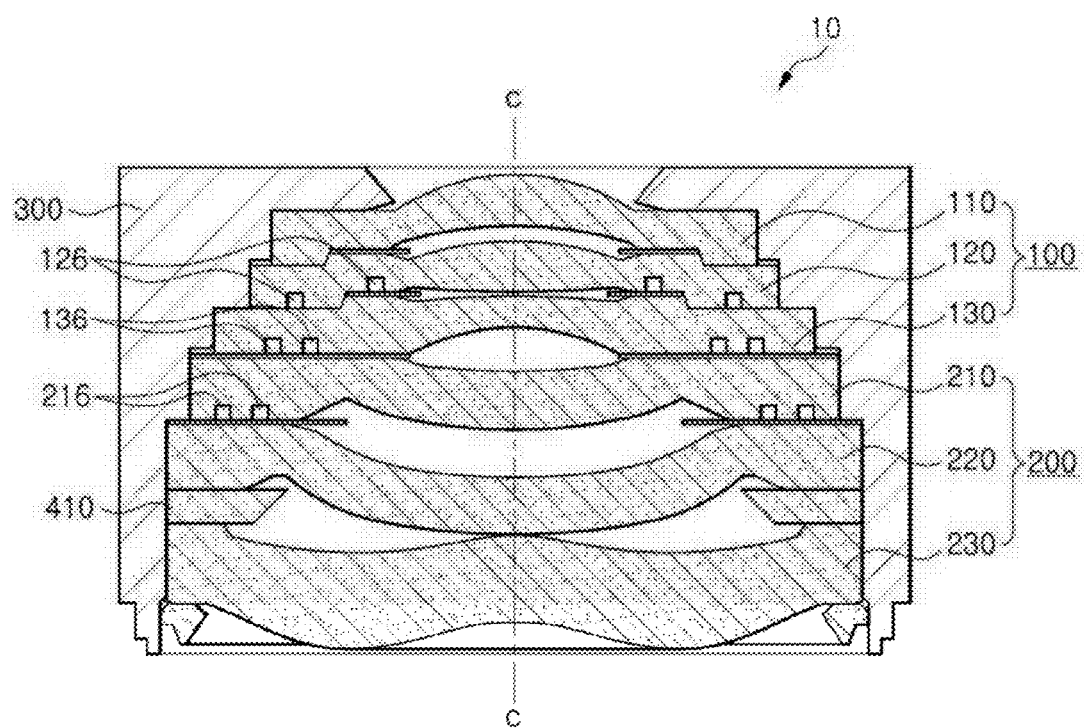
FIG. 12 is a cross-sectional view of a lens module according to another exemplary embodiment of the present disclosure.

A lens module according to another exemplary embodiment of the present disclosure will be described with reference to FIG. 12.

A lens module 10 according to the present exemplary embodiment may be different in terms of a form in which grooves 126, 136, and 216 are formed from the lens modules according to exemplary embodiments of the present disclosure described above. For example, in the present exemplary embodiment, a plurality of grooves 126, 136, and 216 may be formed in each of the lenses.

When the plurality of grooves 126, 136, and 216 are formed in each of the lenses 120, 130, and 210 as described above, stress generated in the lenses may be effectively absorbed or decreased. For reference, although the case in which two grooves 126, 136, and 216 are formed in each of the lenses 120, 130, and 210 has been illustrated in FIG. 12, the number of grooves 126, 136, and 216 formed in each of the lenses may be increased to three or more, if necessary.

As set forth above, according to exemplary embodiments of the present disclosure, the lenses may be easily aligned with each other.

While exemplary embodiments have been shown and described above, it will be apparent to those skilled in the art that modifications and variations could be made without departing from the scope of the present invention as defined by the appended claims.

What is claimed is:

1. A lens module comprising:
 a first lens group including a first set of lenses mounted in a lens barrel and having coupling protrusions formed from light blocking portions, to enable optical axis alignment through coupling of the first set of lenses, wherein a gap is formed between the first lens group and an inner peripheral surface of the lens barrel, wherein a lens of the first lens group has a groove formed parallel to a circumference of the lens, the groove being configured to decrease or absorb coupling stress, and wherein the lens has an auxiliary groove formed to extend in a radial direction from an edge of the lens towards the groove, and to connect to the groove; and
 a second lens group including a second set of lenses sequentially mounted in the lens barrel, such that optical axes of the second set of lenses are aligned with each other by the lens barrel.

2. The lens module of claim 1, wherein the first lens group comprises:
 a first lens, a second lens, and a third lens sequentially disposed from an object side toward an image plane.

3. The lens module of claim 1, wherein the second lens group comprises:
 a fourth lens, a fifth lens, and a sixth lens sequentially disposed from an object side toward an image plane.

4. The lens module of claim 1, wherein the first lens group comprises:
 a first lens, a second lens, a third lens, and a fourth lens sequentially disposed from an object side toward an image plane.

5. The lens module of claim 1, wherein the second lens group comprises:
 a fifth lens and a sixth lens sequentially disposed from an object side toward an image plane.

6. The lens module of claim 1, wherein the groove is formed in a lens closest to the second lens group among the first set of lenses.

7. The lens module of claim 1, wherein a lens of the second lens group has a groove formed therein to decrease or absorb coupling stress.

8. The lens module of claim 7, wherein the groove is formed in a lens closest to the first lens group among the second set of lenses.

9. The lens module of claim 1, wherein each lens configuring the first lens group and the second lens group has two or more steps formed on a light blocking portion of the respective lens.

10. The lens module of claim 1, wherein the lens barrel has a space configured so that molding remaining shapes remaining at edges of each lens configuring the first lens group and the second lens group do not contact the lens barrel.

11. A lens module comprising:
 a lens barrel having inner peripheral surfaces having different sizes in a radial direction;
 a first lens group including a first set of lenses mounted in the lens barrel and having coupling protrusions formed from light blocking portions, to enable optical axis alignment through coupling of the first set of lenses, wherein a gap is formed between the first lens group and an inner peripheral surface of the lens barrel, wherein a lens of the first lens group has a groove formed parallel to a circumference of the lens, the groove being configured to decrease or absorb coupling stress, and wherein the lens has an auxiliary groove formed to extend in a radial direction from an edge of the lens towards the groove, and to connect to the groove; and
 a second lens group disposed so that a distance from the second lens group to an image plane is shorter than a distance from the first lens group to the image plane, and including a second set of lenses contacting the inner peripheral surfaces of the lens barrel, such that optical axes of the second set of lenses are aligned with each other.

12. The lens module of claim 11, wherein the first lens group comprises:
 a first lens, a second lens, and a third lens sequentially disposed from an object side toward the image plane.

13. The lens module of claim 12, wherein a distance between the optical axis and a first coupled part at which the first lens and second lens are coupled to each other, is longer than a distance between the optical axis and a second coupled part at which the second lens and third lens are coupled to each other.

14. The lens module of claim 11, wherein the first lens group comprises:
 a first lens, a second lens, a third lens, and a fourth lens sequentially disposed from an object side toward the image plane.

15. The lens module of claim 14, wherein a distance between the optical axis and a first coupled part at which the first lens and second lens are coupled to each other, is longer than a distance between the optical axis and a second coupled part at which the second lens and third lens are coupled to each other, and
 a distance between the optical axis and a third coupled part at which the third lens and fourth lens are coupled to each other, is longer than the distance between the optical axis and the first coupled part at which the first lens and second lens are coupled to each other.

16. The lens module of claim 11, wherein the groove is formed in a lens having the largest refractive power among the lenses of the first and second lens groups.

17. The lens module of claim 11, wherein the lenses of the first and second lens groups have a lens edge having a conical surface, wherein the lens edge is inclined with respect to the optical axis.

* * * * *